(12) United States Patent
Xia et al.

(10) Patent No.: US 12,151,709 B2
(45) Date of Patent: Nov. 26, 2024

(54) TRAJECTORY PREDICTION METHOD AND APPARATUS, STORAGE MEDIUM, AND ELECTRONIC DEVICE

(71) Applicant: Beijing Sankuai Online Technology Co., Ltd., Beijing (CN)

(72) Inventors: Huaxia Xia, Beijing (CN); Xu Du, Beijing (CN); Yinian Mao, Beijing (CN); Mingyu Fan, Beijing (CN); Dongchun Ren, Beijing (CN); Deheng Qian, Beijing (CN)

(73) Assignee: Beijing Sankuai Online Technology Co., Ltd., Beijing (CN)

( * ) Notice: Subject to any disclaimer, the term of this patent is extended or adjusted under 35 U.S.C. 154(b) by 401 days.

(21) Appl. No.: 17/674,773

(22) Filed: Feb. 17, 2022

(65) Prior Publication Data

US 2022/0324483 A1 Oct. 13, 2022

(30) Foreign Application Priority Data

Apr. 8, 2021 (CN) .......................... 202110374711.5

(51) Int. Cl.
*B60W 60/00* (2020.01)
*B60W 30/095* (2012.01)
(Continued)

(52) U.S. Cl.
CPC .... *B60W 60/0011* (2020.02); *B60W 30/0956* (2013.01); *B60W 40/04* (2013.01);
(Continued)

(58) Field of Classification Search
None
See application file for complete search history.

(56) References Cited

U.S. PATENT DOCUMENTS

2019/0051179 A1\* 2/2019 Alvarez ................. H04W 4/46
2019/0361440 A1\* 11/2019 Wu ....................... G05D 1/0289
(Continued)

FOREIGN PATENT DOCUMENTS

| CN | 111079721 A | 4/2020 |
| CN | 111238523 A | 6/2020 |

(Continued)

OTHER PUBLICATIONS

State Intellectual Property Office of the People's Republic of China, Office Action and Search Report Issued in Application No. 2021103747115, May 14, 2021, 13 pages. (Submitted with Machine/Partial Translation).

(Continued)

*Primary Examiner* — Hongye Liang
(74) *Attorney, Agent, or Firm* — Kilpatrick Townsend & Stockton LLP

(57) ABSTRACT

A trajectory prediction method and apparatus, a storage medium, and an electronic device are provided. In embodiments of this disclosure, according to a historical trajectory of a designated target and a historical trajectory of each obstacle, a historical interaction feature between the designated target and each obstacle is determined, and a motion trajectory of the designated target is predicted to obtain an initial predicted trajectory. A future interaction feature between each obstacle and the designated target is then determined according to the initial predicted trajectory and a planned trajectory of each obstacle. According to the future interaction feature, a final predicted trajectory of the designated target is obtained.

17 Claims, 5 Drawing Sheets

(51) Int. Cl.
*B60W 40/04* (2006.01)
*B60W 50/00* (2006.01)
*G06N 3/04* (2023.01)
*G16Y 20/10* (2020.01)
*G16Y 40/50* (2020.01)

(52) U.S. Cl.
CPC .... *B60W 50/0097* (2013.01); *B60W 60/0015* (2020.02); *B60W 60/00274* (2020.02); *G06N 3/04* (2013.01); *G16Y 20/10* (2020.01); *G16Y 40/50* (2020.01); *B60W 2554/4041* (2020.02); *B60W 2554/4044* (2020.02); *B60W 2554/4045* (2020.02); *B60W 2556/10* (2020.02)

(56) References Cited

U.S. PATENT DOCUMENTS

2021/0001884 A1    1/2021   Alvarez et al.
2021/0387645 A1*  12/2021   Kim ............... B60W 30/18154

FOREIGN PATENT DOCUMENTS

CN      112348293 A      2/2021
DE     102018105014 A1   9/2018

OTHER PUBLICATIONS

Song H, Ding W, Chen Y, et al. "PiP: Planning-informed Trajectory Prediction for Autonomous Driving" arXiv preprint arXiv:2003.11476, Jan. 18, 2021, 16 pages.

Deo, N., Trivedi, M.M.: "Convolutional social pooling for vehicle trajectory prediction." "In: Proceedings of the IEEE Conference on Computer Vision and Pattern Recognition Workshops (CVPR). pp. 1468-1476 (2018)" May 15, 2018, 9 pages.

Vaswani A, Shazeer N, Parmar N, et al. "Attention is all you need" "[J]. arXiv preprint arXiv:1706.03762, 2017", Dec. 6, 2017, 15 pages.

* cited by examiner

TRAJECTORY PREDICTION METHOD AND APPARATUS, STORAGE MEDIUM, AND ELECTRONIC DEVICE

CROSS REFERENCE TO RELATED APPLICATIONS

The present application claims priority to Chinese Patent Application No. 202110374711.5, filed on Apr. 8, 2021, which is incorporated herein by reference in its entirety.

TECHNICAL FIELD

This disclosure relates to the field of unmanned driving, and in particular, to a trajectory prediction method and apparatus, a storage medium, and an electronic device.

BACKGROUND

In the field of unmanned driving, an unmanned device needs to plan a corresponding motion trajectory in real time according to changes in a surrounding environment. Whether the motion trajectory planned by the unmanned device is appropriate depends on prediction of motion trajectories of surrounding obstacles by the unmanned device.

SUMMARY

Embodiments provide a trajectory prediction method and apparatus, a storage medium, and an electronic device.

A trajectory prediction method is provided. The method includes:

obtaining trajectories of each obstacle within a predetermined range around a designated target and a historical trajectory of the designated target, the trajectories of each obstacle including a historical trajectory and a planned trajectory;

determining a historical interaction feature between each obstacle and the designated target according to the historical trajectory of each obstacle and the historical trajectory of the designated target;

predicting a motion trajectory of the designated target according to the historical interaction feature, to obtain an initial predicted trajectory;

determining a future interaction feature between each obstacle and the designated target according to the initial predicted trajectory and the planned trajectory of each obstacle; and adjusting the initial predicted trajectory according to the future interaction feature, to obtain a final predicted trajectory of the designated target.

This disclosure provides a trajectory prediction apparatus, including:

an obtaining module, configured to obtain trajectories of each obstacle within a predetermined range around a designated target and a historical trajectory of the designated target, the trajectories of each obstacle including a historical trajectory and a planned trajectory;

a first determining module, configured to determine a historical interaction feature between each obstacle and the designated target according to the historical trajectory of each obstacle and the historical trajectory of the designated target;

an initial prediction module, configured to predict a motion trajectory of the designated target according to the historical interaction feature, to obtain an initial predicted trajectory;

a second determining module, configured to determine a future interaction feature between each obstacle and the designated target according to the initial predicted trajectory and the planned trajectory of each obstacle; and a final prediction module, configured to adjust the initial predicted trajectory according to the future interaction feature, to obtain a final predicted trajectory of the designated target.

Some embodiments provide a computer-readable storage medium, storing a computer program, the computer program, when executed by a processor, implementing the foregoing trajectory prediction method.

Some embodiments provide an electronic device, including a memory, a processor, and a computer program stored in the memory and executable on the processor, the processor, when executing the program, implementing the foregoing trajectory prediction method.

The at least one technical solution adopted in the embodiments of this disclosure can achieve the following beneficial effects:

In some embodiments, according to the historical trajectory of the designated target and the historical trajectory of each obstacle, the historical interaction feature between the designated target and each obstacle is determined, and the motion trajectory of the designated target is predicted to obtain the initial predicted trajectory. The future interaction feature between each obstacle and the designated target is then determined according to the initial predicted trajectory and the planned trajectory of each obstacle. According to the future interaction feature, the final predicted trajectory of the designated target is obtained. In this method, time dimensions of trajectories based on which the initial predicted trajectory of the designated target is predicted are all historical time dimensions, and time dimensions of trajectories based on which the final predicted trajectory of the designated target is predicted are all future time dimensions. instead of directly predicting the final predicted trajectory of the designated target according to the historical trajectory of the designated target and the planned trajectory of each obstacle. Therefore, the problem of different time dimensions can be avoided, thereby improving the accuracy of predicting the motion trajectory of the designated target.

BRIEF DESCRIPTION OF THE DRAWINGS

Accompanying drawings described herein are used for providing further understanding about this disclosure, and constitute a part of this disclosure. Exemplary embodiments of this disclosure and descriptions thereof are used for explaining this disclosure, and do not constitute an inappropriate limitation on this disclosure. In the accompanying drawings.

DETAILED DESCRIPTION OF THE EMBODIMENTS

Figure 1:
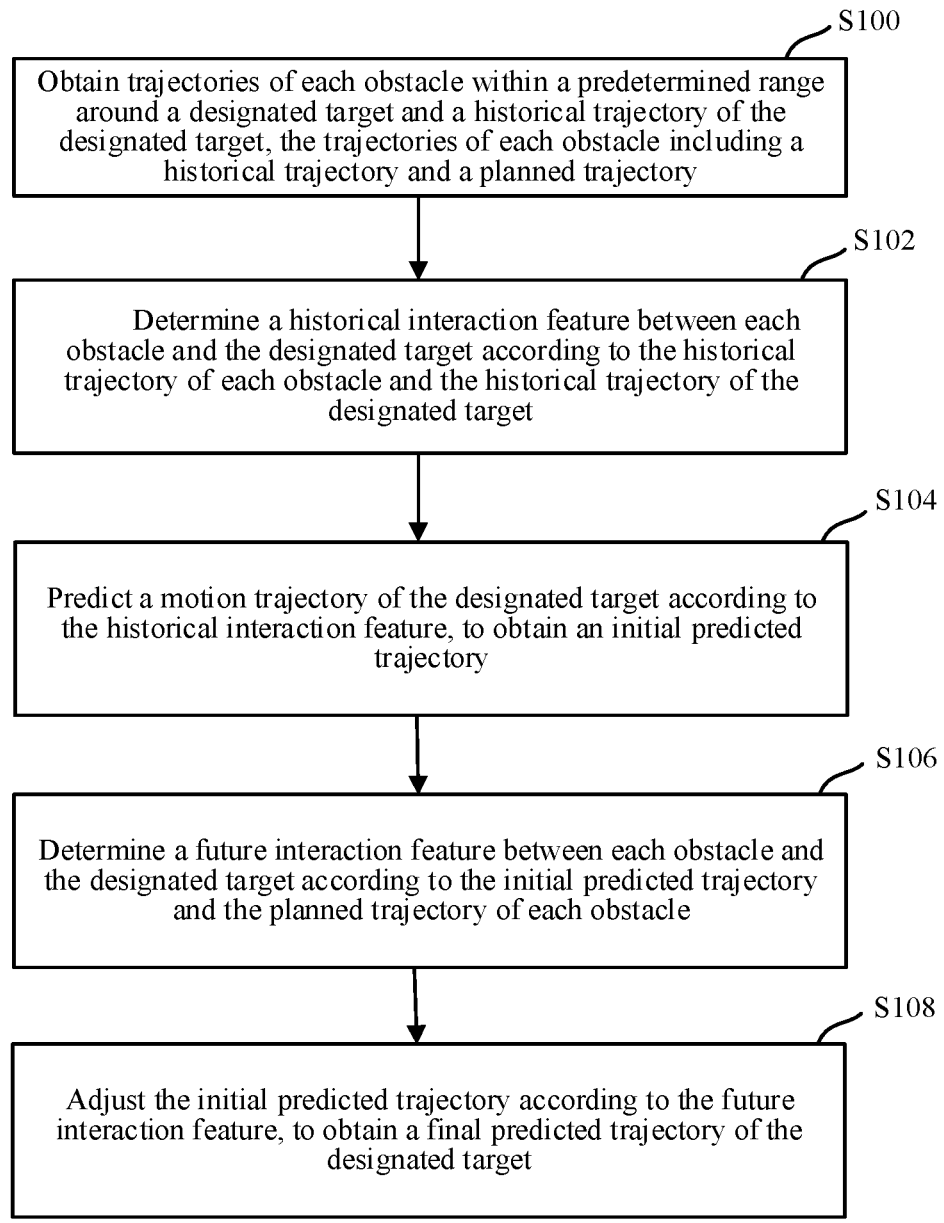
FIG. 1 is a schematic diagram of a trajectory prediction process according to an embodiment.

Generally, an obstacle to be predicted by an unmanned device may be used as a designated target. During prediction of the designated target, a historical trajectory of the designated target, historical trajectories of other obstacles around the designated target, and an initial planned trajectory of the unmanned device are first obtained. The obtained historical trajectory of the designated target, the historical motion trajectories of other obstacles around the designated target, and the initial planned trajectory of the unmanned device are then inputted into a prediction model. A feature of the initial planned trajectory of the unmanned device is directly fused with a feature of each historical trajectory by using the prediction model. According to a fusion result, a motion trajectory of the designated target is predicted. Since the initial planned trajectory is a trajectory in a future period of time, and the historical trajectory is a trajectory in a previous period of time, there is a difference in time dimension when the initial planned trajectory and each historical trajectory are fused, and an interaction feature obtained by fusion is neither a historical interaction feature nor a future interaction feature. In other words, the fused interaction feature cannot accurately represent the historical interaction between the designated target and each obstacle, nor can it accurately represent the future interaction between the designated target and each obstacle. Therefore, predicting the motion trajectory of the designated target in a future time dimension through the fused interaction feature leads to an inaccurate prediction result of the designated target.

In an example, in the historical time dimension, a historical interaction feature between the designated target and each obstacle is first determined according to the historical trajectory of each obstacle around the designated target and the historical trajectory of the designated target. In the future time dimension, an initial predicted trajectory of the designated target and a planned trajectory of each obstacle are then obtained according to the historical interaction feature, and a future interaction feature between the designated target and each obstacle is determined. The planned trajectory of each obstacle may be an initial planned trajectory of each obstacle, for example, an initial planned trajectory of an unmanned device. According to the future interaction feature, a final predicted trajectory of the designated target is obtained. Finally, according to the final predicted trajectory of the designated target, the current initial planned trajectory of the unmanned device is updated to control the unmanned device to travel based on the current latest planned trajectory. Whether the initial predicted trajectory of the designated target or the final predicted trajectory of the designated target is predicted, the trajectory of the designated target and the trajectory of each obstacle that need to be fused are in the same time dimension, thereby improving the accuracy of predicting the motion trajectory of the designated target.

To state the objectives, technical solutions, and advantages in accordance with this disclosure, the technical solutions of this disclosure will be described below with reference to specific embodiments of this disclosure and corresponding accompanying drawings. Apparently, the described embodiments are merely some but not all of the embodiments of this disclosure. Based on the embodiments of this disclosure, all other embodiments obtained by a person of ordinary skill in the art without creative efforts shall fall within the protection scope of this disclosure.

The technical solutions provided in the embodiments herein are described and illustrated in detail below with reference to the accompanying drawings.

FIG. 1 is a schematic diagram of a trajectory prediction process according to an embodiment. The trajectory prediction process includes:

S100: Obtain trajectories of each obstacle within a predetermined range around a designated target and a historical trajectory of the designated target, the trajectories of each obstacle including a historical trajectory and a planned trajectory.

In this embodiment, the trajectory prediction method shown in FIG. 1 may be applied to a server that controls an unmanned device, or may be applied to an unmanned device. Next, the trajectory prediction method shown in FIG. 1 is described by taking an example in which the trajectory prediction method is applied to an unmanned device. The unmanned devices described in this disclosure may include unmanned vehicles and unmanned aerial vehicles. The unmanned device may be used in the field of logistics and distribution, including both instant distribution fields such as takeout and distribution, and other non-instant distribution fields.

In this embodiment, each obstacle within a predetermined range around the unmanned device is first determined, dynamic non-unmanned devices are selected from the determined obstacles, and each dynamic non-unmanned device may be used as a designated target. The unmanned device may be an unmanned vehicle, and the dynamic non-unmanned device may be a person-driving device with mobility capabilities, for example, a person-driving vehicle.

Figure 2A:
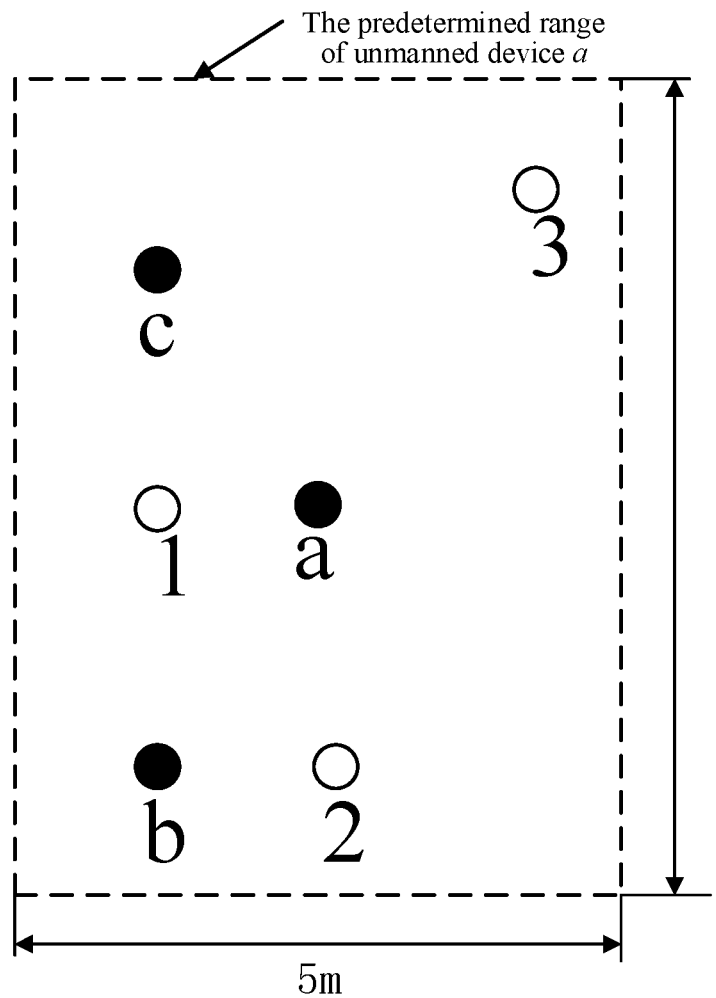
FIG. 2A is a schematic diagram of a predetermined range of an unmanned device according to an embodiment.
Figure 2B:
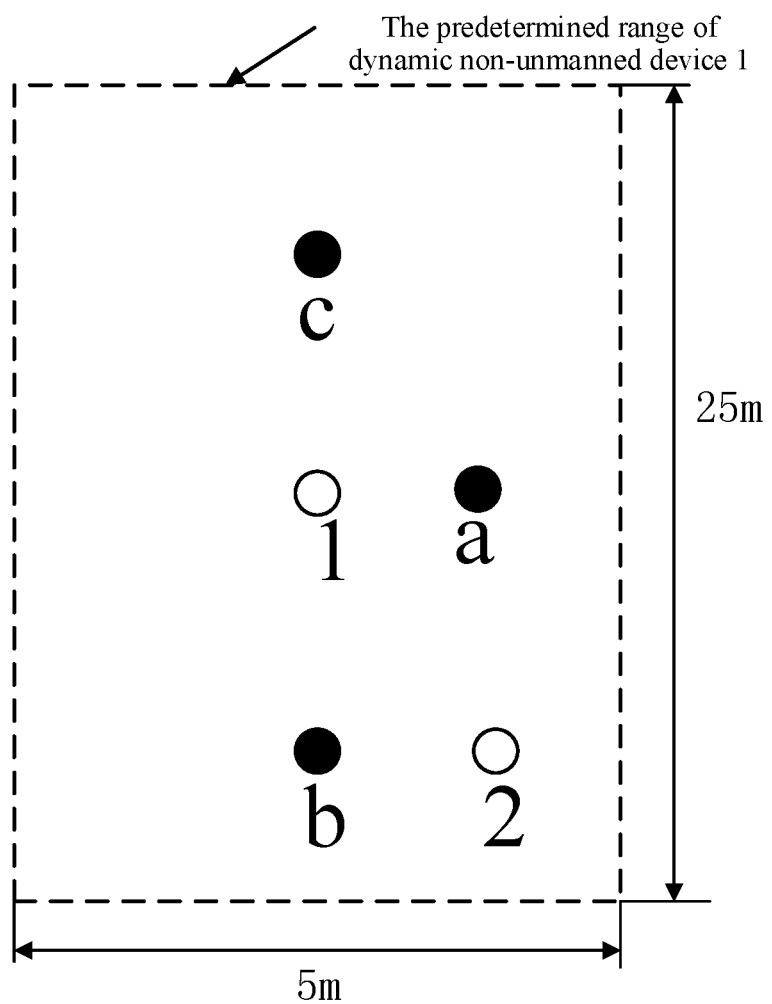
FIG. 2B is a schematic diagram of a predetermined range of a designated target according to an embodiment.

Further, for each designated target, trajectories of each obstacle within a predetermined range around the designated target and a historical trajectory of the designated target may be obtained. For the designated target, the obstacles within the predetermined range around the designated target include: unmanned devices and dynamic non-unmanned devices. As shown in FIG. 2A and FIG. 2B:

In FIG. 2A, the black dots represent unmanned devices and the white dots represent dynamic non-unmanned devices. An unmanned device is a. By using the unmanned device a as a center, a rectangular range of 25 m*5 m is used as a predetermined range of the unmanned device a. Obstacles in the predetermined range around the unmanned device a include: other unmanned devices b and c, and dynamic non-unmanned device 1, 2 and 3. The dynamic non-unmanned devices 1, 2, and 3 are all designated targets.

In FIG. 2B, the dynamic non-unmanned device 1 is used as a designated target, the designated target 1 is used as a center, and the rectangular range of 25 m*5 m is used as the predetermined range of the designated target 1. Obstacles in the predetermined range around the designated target 1 include: the unmanned devices a, b and c, and the dynamic non-unmanned device 2.

Further, for each unmanned device within the predetermined range around the designated target, a historical trajectory and a planned trajectory of the unmanned device may be obtained. The planned trajectory of the unmanned device may be a current initial planned trajectory of the unmanned device. For the dynamic non-unmanned device within the predetermined range around the designated target, a historical trajectory of the dynamic non-unmanned device may be obtained.

In FIG. 2B, historical trajectories and planned trajectories of the unmanned devices a, b, and c are obtained, and a historical trajectory of the dynamic non-unmanned device 2 is obtained.

During obtaining of the planned trajectory of each obstacle within the predetermined range around the designated target, for the unmanned device, a future driving trajectory planned by the unmanned device may be obtained based on the Internet of Vehicles as the planned trajectory; and for the dynamic non-unmanned device, taking a person-driving vehicle as an example, the driver may determine a future driving trajectory autonomously, without the need for the vehicle to plan the future driving trajectory. Therefore, in a case that the dynamic non-unmanned device does not need to plan the future driving trajectory, the unmanned device may obtain an empty trajectory of the dynamic non-unmanned device as the planned trajectory, or may obtain any specified trajectory as the planned trajectory of the dynamic non-unmanned device. In addition, the dynamic non-unmanned device may further predict a respective driving trajectory according to a driving behavior of the driver and a surrounding environment. In this case, the unmanned device may directly obtain the driving trajectory predicted by the dynamic non-unmanned device as the planned trajectory.

It should be noted that, the trajectory prediction method shown in FIG. 1 is described in detail in this embodiment by taking an example in which the unmanned device obtains the empty trajectory or any specified trajectory of the dynamic non-unmanned device.

S102: Determine a historical interaction feature between each obstacle and the designated target according to the historical trajectory of each obstacle and the historical trajectory of the designated target.

In this embodiment, for each designated target, a historical trajectory of each obstacle within a predetermined range around the designated target and a historical trajectory of the designated target are first obtained. The historical trajectory of each obstacle and the historical trajectory of the designated target are then inputted into a historical trajectory feature extraction submodel of a pre-trained prediction model, to obtain the historical interaction feature between each obstacle and the designated target outputted by the historical trajectory feature extraction submodel. The historical interaction feature refers to an interaction feature between any two of all entities including all the obstacles and the designated target historically. The interaction refers to the interaction between different entities involved in transportation.

Figure 3:
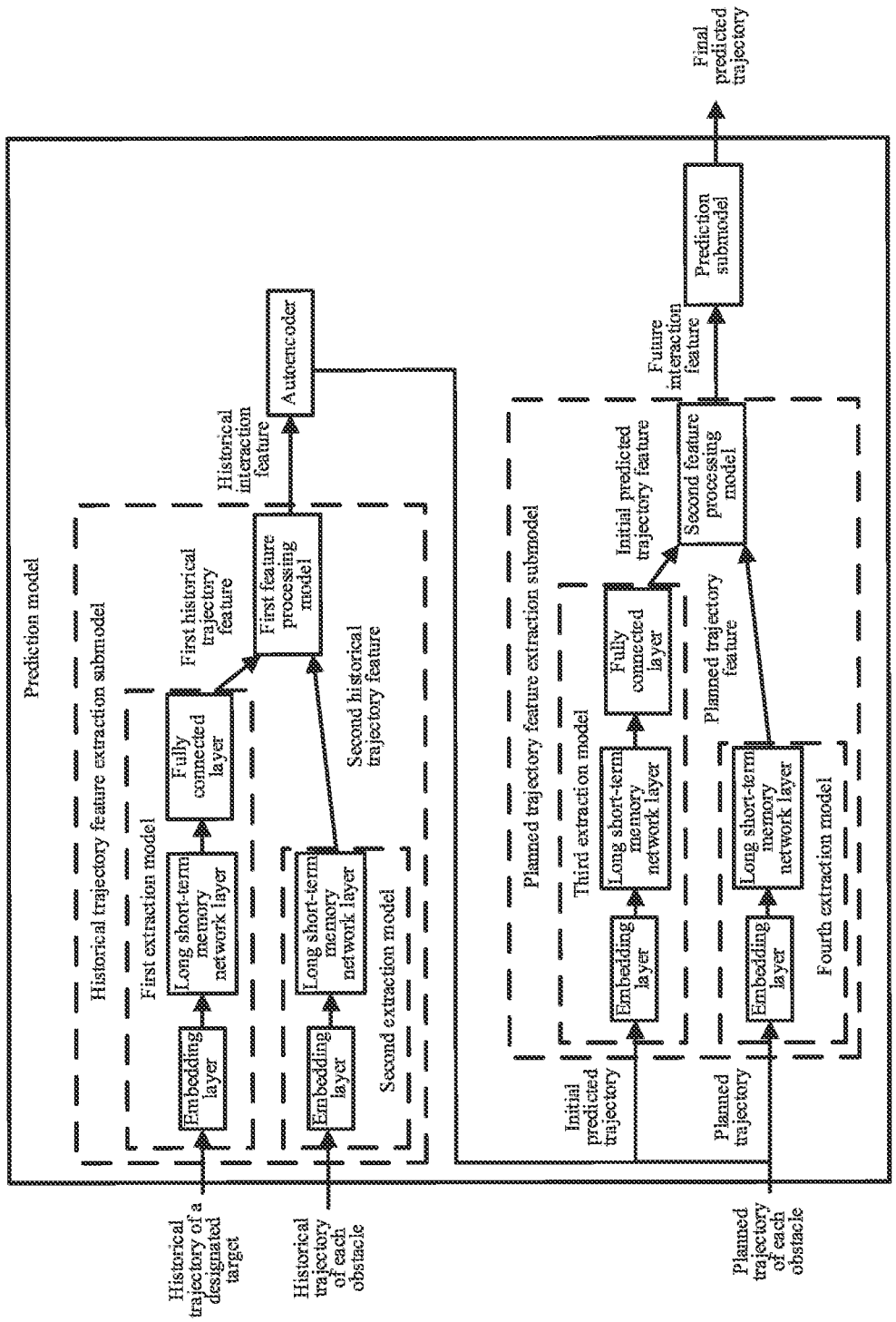
FIG. 3 is a schematic structural diagram of a prediction model according to an embodiment.

A schematic structural diagram of the foregoing pre-trained prediction model is shown in FIG. 3. In FIG. 3, the prediction model may include: a historical trajectory feature extraction submodel, an autoencoder, a planned trajectory feature extraction submodel, and a prediction submodel. The historical trajectory feature extraction submodel may include: a first extraction model, a second extraction model, and a first feature processing model. The planned trajectory feature extraction submodel may include: a third extraction model, a fourth extraction model, and a second feature processing model. The first extraction model may include: an embedding layer, a long short-term memory network layer, and a fully connected layer. The second extraction model may include: an embedding layer and a long short-term memory network layer. The third extraction model has the same structure as the first extraction model, and the fourth extraction model is the same as the second extraction model.

For example, based on the prediction model shown in FIG. 3, the historical trajectory of the designated target may be inputted into the first extraction model in the historical trajectory feature extraction submodel, and feature extraction may be performed on the historical trajectory of the designated target by using the embedding layer, the long short-term memory network layer, and the fully connected layer in the first extraction model, to obtain a first historical trajectory feature. In addition, the historical trajectory of each obstacle is inputted into the second extraction model in the historical trajectory feature extraction submodel, and feature extraction is performed on the historical trajectory of each obstacle by using the embedding layer and the long short-term memory network layer in the second extraction model, to obtain a second historical trajectory feature. The first historical trajectory feature and the second historical trajectory feature are then inputted into the first feature processing model in the historical trajectory feature extraction submodel, and the first historical trajectory feature and the second historical trajectory feature are fused by using the first feature processing model, to obtain the historical interaction feature between each obstacle and the designated target. The fusion methods may include: concatenation and pooling.

S104: Predict a motion trajectory of the designated target according to the historical interaction feature, to obtain an initial predicted trajectory.

In this embodiment, for each designated target, after the historical interaction feature between each obstacle within the predetermined range around the designated target and the designated target is obtained, the historical interaction feature may be inputted into the autoencoder of the prediction model, and a motion trajectory of the designated target is predicted by using the autoencoder, to obtain an initial predicted trajectory; of the designated target.

S106: Determine a future interaction feature between each obstacle and the designated target according to the initial predicted trajectory and the planned trajectory of each obstacle.

In this embodiment, initial predicted trajectories of all designated targets (the designated targets herein refer to dynamic non-unmanned devices) may be predicted first by using the method of the foregoing steps S100 to S104. For each designated target, initial predicted trajectories of other designated targets except the designated target are then used as respective planned trajectories of the other designated targets, and step S106 is performed. During prediction of a final predicted trajectory of the designated target, a future interaction feature between each obstacle within the predetermined range around the designated target and the designated target may be determined according to the initial predicted trajectory of the designated target, the planned trajectory of the unmanned device, and the planned trajectories of other designated targets.

In FIG. 2B, the dynamic non-unmanned devices within the predetermined range of the unmanned device a are only the dynamic non-unmanned device 1 and the dynamic non-unmanned device 2. Therefore, both the dynamic non-unmanned device 1 and the dynamic non-unmanned device 2 are designated targets of the unmanned device a. The foregoing steps S100 to S104 may be performed for the dynamic non-unmanned device 1 first to obtain an initial predicted trajectory of the dynamic non-unmanned device 1. The foregoing steps S100 to S104 may then be performed for the dynamic non-unmanned device 2 to obtain an initial predicted trajectory of the dynamic non-unmanned device 2. In this way, the initial predicted trajectories of both the dynamic non-unmanned device 1 and the dynamic non-unmanned device 2 may be obtained. When a final predicted trajectory of the dynamic non-unmanned device 1 needs to be predicted, the initial predicted trajectory of the dynamic non-unmanned device 2 may be used as a planned trajectory of the dynamic non-unmanned device 2. In this way, the final predicted trajectory of the dynamic non-unmanned device 1 may be predicted according to the initial predicted trajectory of the dynamic non-unmanned device 1, the planned trajectory of the dynamic non-unmanned device 2, a planned trajectory of the unmanned device a, a planned trajectory of the unmanned device b, and a planned trajectory of the unmanned device c.

For example, the initial predicted trajectory of the designated target is inputted into the third extraction model in the planned trajectory feature extraction submodel, and feature extraction is performed on the initial predicted trajectory by using the embedding layer, the long short-term memory network layer, and the fully connected layer in the third extraction model, to obtain an initial predicted trajectory feature. In addition, the planned trajectory of each obstacle (for example, when the designated target is the dynamic non-unmanned device 1, the obstacles are the unmanned device a, b, and c, and the other designated target 2) is inputted into the fourth extraction model in the planned trajectory feature extraction submodel, and feature extraction is performed on the inputted planned trajectory by using the embedding layer and the long short-term memory network layer in the fourth extraction model, to obtain a planned trajectory feature. The initial predicted trajectory feature and the planned trajectory feature are inputted into the second feature processing model in the planned trajectory feature extraction submodel, and the initial predicted trajectory feature and the planned trajectory feature are fused by using the second feature processing model, to obtain the future interaction feature between each obstacle and the designated target.

S108: Adjust the initial predicted trajectory according to the future interaction feature, to obtain a final predicted trajectory of the designated target.

In this embodiment, for each designated target, the future interaction feature between the designated target and each obstacle is inputted into the prediction submodel of the prediction model, and the initial predicted trajectory of the designated target is adjusted by using the prediction submodel to obtain the final predicted trajectory of the designated target. The prediction submodel may be a Transformer model. The adjustment may be a local modification of the initial predicted trajectory, or a replacement of the initial predicted trajectory.

In this embodiment, after final predicted trajectories of all the designated targets within the predetermined range of the unmanned device, according to the final predicted trajectory of each designated target, the current initial planned trajectory of the unmanned device may be updated to control the unmanned device to travel based on the current latest planned trajectory.

As can be seen from the foregoing method shown in FIG. 1, in this disclosure, for each designated target, the historical interaction feature between the designated target and each obstacle is determined according to the historical trajectory of the designated target and the historical trajectory of each obstacle within the predetermined range around the designated target. The historical interaction feature is the interaction between the trajectory of the designated target and the trajectory of each obstacle historically. The motion trajectory of the designated target is predicted according to the historical interaction feature, to obtain an initial predicted trajectory. In this way, according to the historical trajectory of the designated target in the historical time dimension, the initial predicted trajectory of the designated target in the future time dimension is obtained. After the initial predicted trajectory of the designated target is obtained, the planned trajectory of each obstacle within the predetermined range around the designated target in the future time dimension also needs to be considered to determine the interaction between the trajectory of the designated target and the trajectory of each obstacle in the future time dimension. That is, the future interaction feature between each obstacle and the designated target is determined according to the initial predicted trajectory and a planned trajectory of each obstacle. According to the future interaction feature, the final predicted trajectory of the designated target is obtained. In step S102, when the historical interaction feature is obtained by fusing the trajectories of the designated target and each obstacle, the time dimensions of the trajectories are all historical time dimensions. In step S106, when the future interaction feature is obtained by fusing the trajectories of the designated target and each obstacle, although the initial prediction of the designated target is not accurate, the time dimension of the trajectory is the future time dimension. Therefore, the problem of different time dimensions can be avoided, thereby improving the accuracy of predicting the motion trajectory of the designated target.

Further, before step S100 shown in FIG. 1, the prediction model in this embodiment needs to be trained.

During training of the prediction model, a plurality of submodels in the prediction model may be jointly trained.

For example, trajectories of each sample obstacle within a predetermined range around a sample target and a historical trajectory of the sample target may be obtained, the trajectories of each sample obstacle including a historical trajectory and a planned trajectory. The historical trajectory of the sample target and the historical trajectory of each sample obstacle are first inputted into the historical trajectory feature extraction submodel, to obtain a to-be-optimized historical interaction feature outputted by the historical trajectory feature extraction submodel. The to-be-optimized historical interaction feature is then inputted into the autoencoder in the prediction model, to obtain a to-be-optimized initial predicted trajectory of the sample target outputted by the autoencoder. The to-be-optimized initial predicted trajectory and the planned trajectory of each sample obstacle are inputted into the planned trajectory feature extraction submodel, to obtain a to-be-optimized future interaction feature outputted by the planned trajectory feature extraction submodel. Finally, the to-be-optimized future interaction feature is inputted into the prediction submodel, to obtain a to-be-optimized final predicted trajectory of the sample target. The prediction model is trained by using minimization of a difference between the to-be-optimized final predicted trajectory and a real motion trajectory of the sample target as a training objective.

In addition, the historical trajectory feature extraction submodel and the planned trajectory feature extraction submodel may be alternatively pre-trained, and the trained historical trajectory feature extraction submodel and the trained planned trajectory feature extraction submodel are applied to the prediction model. In this case, during training of the prediction model, the autoencoder and the prediction submodel may be jointly trained.

Specifically, the obtained trajectories of each sample obstacle within the preset range around the sample target and the historical trajectory of the sample target are inputted into the historical trajectory feature extraction submodel to obtain the historical interaction feature. The historical interaction feature is inputted into the autoencoder to obtain the to-be-optimized initial predicted trajectory. The to-be-optimized initial predicted trajectory and the planned trajectory of each sample obstacle are then inputted into the planned trajectory feature extraction submodel, to obtain the future interaction feature. The future interaction feature is inputted into the prediction submodel, to obtain the to-be-optimized final predicted trajectory. Parameters in the autoencoder and the prediction submodel are then adjusted by using minimization of a difference between the to-be-optimized final predicted trajectory and a real motion trajectory of the sample target as an objective.

The above describes the trajectory prediction method provided in the embodiments of this disclosure. Based on the same idea, this disclosure further provides a corresponding apparatus, a storage medium, and an electronic device.

Figure 4:
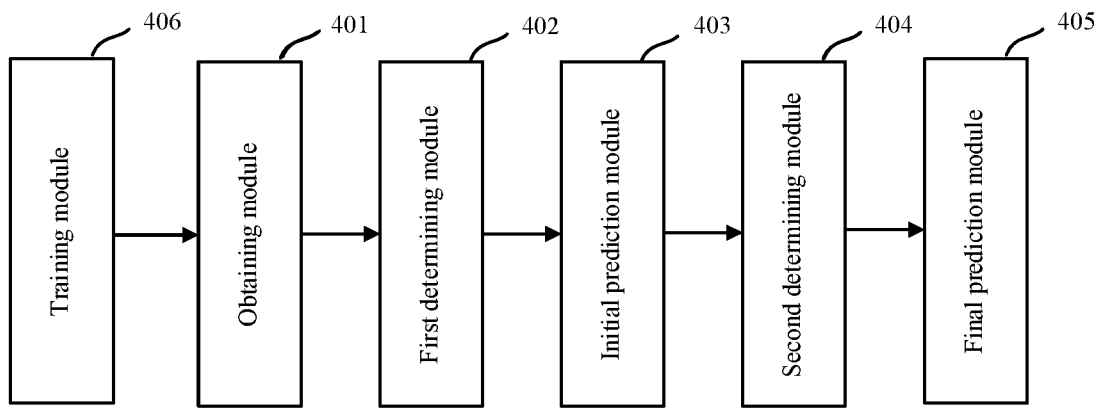
FIG. 4 is a schematic structural diagram of a trajectory prediction apparatus according to an embodiment.

FIG. 4 is a schematic structural diagram of a trajectory prediction apparatus according to an embodiment. The apparatus includes:

an obtaining module 401, configured to obtain trajectories of each obstacle within a predetermined range around a designated target and a historical trajectory of the designated target, the trajectories of each obstacle including a historical trajectory and a planned trajectory;

a first determining module 402, configured to determine a historical interaction feature between each obstacle and the designated target according to the historical trajectory of each obstacle and the historical trajectory of the designated target;

an initial prediction module 403, configured to predict a motion trajectory of the designated target according to the historical interaction feature, to obtain an initial predicted trajectory;

a second determining module 404, configured to determine a future interaction feature between each obstacle and the designated target according to the initial predicted trajectory and the planned trajectory of each obstacle; and a final prediction module 405, configured to adjust the initial predicted trajectory according to the future interaction feature, to obtain a final predicted trajectory of the designated target.

In some embodiments, the designated target is a dynamic non-unmanned device.

In some embodiments, the obtaining module 401 is further configured to: for each obstacle within the predetermined range around the designated target, obtain, based on the Internet of Vehicles, a planned trajectory planned by the obstacle if the obstacle is an unmanned device.

In some embodiments, the first determining module 402 is further configured to input the historical trajectory of each obstacle and the historical trajectory of the designated target into a historical trajectory feature extraction submodel of a pre-trained prediction model, to obtain the historical interaction feature between each obstacle and the designated target outputted by the historical trajectory feature extraction submodel.

In some embodiments, the first determining module 402 is further configured to: input the historical trajectory of the designated target into a first extraction model in the historical trajectory feature extraction submodel, and perform feature extraction on the historical trajectory of the designated target by using the first extraction model, to obtain a first historical trajectory feature; input the historical trajectory of each obstacle into a second extraction model in the historical trajectory feature extraction submodel, and perform feature extraction on the historical trajectory of each obstacle by using the second extraction model, to obtain a second historical trajectory feature; and input the first historical trajectory feature and the second historical trajectory feature into a first feature processing model in the historical trajectory feature extraction submodel, and fuse the first historical trajectory feature and the second historical trajectory feature by using the first feature processing model, to obtain the historical interaction feature between each obstacle and the designated target.

In some embodiments, the first determining module 402 is further configured to: input the historical trajectory of the designated target into an embedding layer in the first extraction model; input an output of the embedding layer in the first extraction model into a long short-term memory network layer in the first extraction model; input an output of the long short-term memory network layer in the first extraction model into a fully connected layer in the first extraction model; input the historical trajectory of each obstacle into an embedding layer in the second extraction model; and input a output of the embedding layer in the second extraction model into a long short-term memory network layer in the second extraction model.

In some embodiments, the initial prediction module 403 is further configured to input the historical interaction feature into an autoencoder in the prediction model, to obtain the initial predicted trajectory of the designated target outputted by the autoencoder.

In some embodiments, the second determining module 404 is further configured to input the initial predicted trajectory and the planned trajectory of each obstacle into a planned trajectory feature extraction submodel of the prediction model, to obtain the future interaction feature between each obstacle and the designated target outputted by the planned trajectory feature extraction submodel.

In some embodiments, the second determining module 404 is further configured to: input the initial predicted trajectory into a third extraction model in the planned trajectory feature extraction submodel, and perform feature extraction on the initial predicted trajectory by using the third extraction model, to obtain an initial predicted trajectory feature; input the planned trajectory of each obstacle into a fourth extraction model in the planned trajectory feature extraction submodel, and perform feature extraction on the planned trajectory of each obstacle by using the fourth extraction model, to obtain a planned trajectory feature; and input the initial predicted trajectory feature and the planned trajectory feature into a second feature processing model in the planned trajectory feature extraction submodel, and fuse the initial predicted trajectory feature and the planned trajectory feature by using the second feature processing model, to obtain the future interaction feature between each obstacle and the designated target.

In some embodiments, the second determining module 404 is further configured to: input the initial predicted trajectory into an embedding layer in the third extraction model; input an output of the embedding layer in the third extraction model into a long short-term memory network layer in the third extraction model; input an output of the long short-term memory network layer in the third extraction model into a fully connected layer in the third extraction model; input the planned trajectory of each obstacle into an embedding layer in the fourth extraction model; and input the output of the embedding layer in the fourth extraction model into the long short-term memory network layer in the fourth extraction model.

In some embodiments, the second determining module 404 is further configured to use an initial predicted trajectory predicted for the obstacle as the planned trajectory of the obstacle if the obstacle is a dynamic non-unmanned device.

In some embodiments, the final prediction module 405 is further configured to input the future interaction feature into a prediction submodel of the prediction model, to obtain the final predicted trajectory of the designated target outputted by the prediction submodel.

In some embodiments, the apparatus further includes a training module 406; and the training module 406 is configured to: pre-obtain trajectories of each sample obstacle within a predetermined range around a sample target and a historical trajectory of the sample target, the trajectories of each sample obstacle including a historical trajectory and a planned trajectory; input the historical trajectory of the sample target and the historical trajectory of each sample obstacle into the historical trajectory feature extraction submodel, to obtain a to-be-optimized historical interaction feature outputted by the historical trajectory feature extraction submodel; input the to-be-optimized historical interaction feature into the autoencoder in the prediction model, to obtain a to-be-optimized initial predicted trajectory of the sample target outputted by the autoencoder; input the to-be-optimized initial predicted trajectory and the planned trajectory of each sample obstacle into the planned trajectory feature extraction submodel, to obtain a to-be-optimized future interaction feature outputted by the planned trajectory feature extraction submodel; input the to-be-optimized future interaction feature into the prediction submodel, to obtain a to-be-optimized final predicted trajectory of the sample target; and train the prediction model by using minimization of a difference between the to-be-optimized final predicted trajectory and a real motion trajectory of the sample target as a training objective.

Some embodiments provide a computer-readable storage medium, storing a computer program, where the computer program, when executed by a processor, may be configured to implement the foregoing trajectory prediction method provided in FIG. 1.

Figure 5:
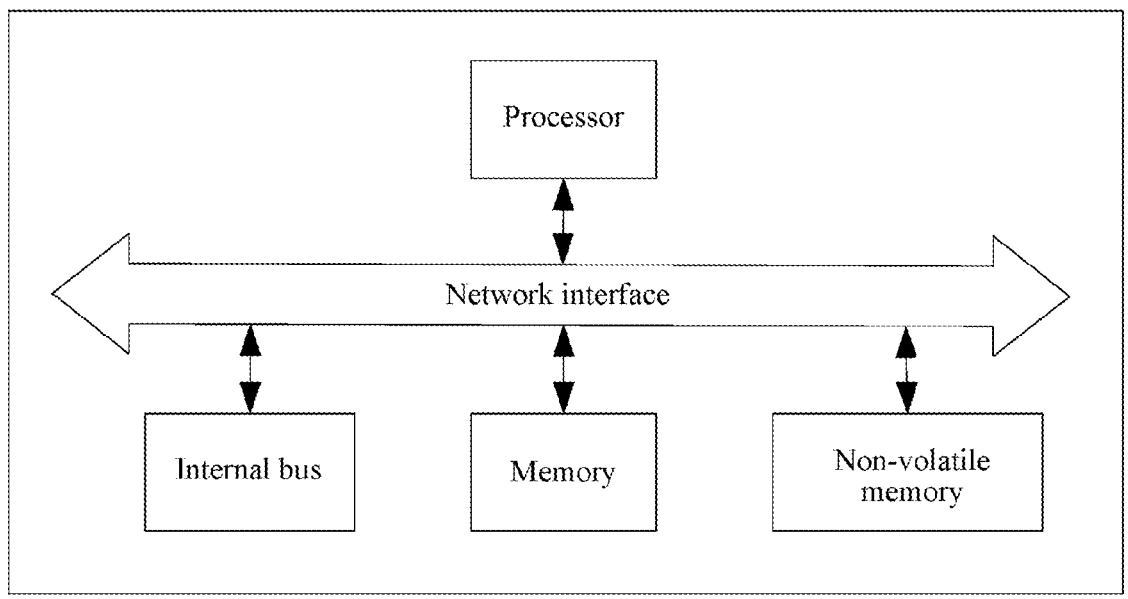
FIG. 5 is a schematic structural diagram of an electronic device according to an embodiment.

Based on the motion trajectory prediction method shown in FIG. 1, the embodiments of this disclosure further provide a schematic structural diagram of an unmanned device shown in FIG. 5. Referring to FIG. 5, at a hardware level, the unmanned device includes a processor, an internal bus, a network interface, a memory, and a non-volatile memory, and may certainly further include hardware required for other services. The processor reads a corresponding computer program from the non-volatile storage into the memory and then runs the computer program to implement the trajectory prediction method shown in FIG. 1.

Definitely, in addition to a software implementation, this disclosure does not exclude other implementations, for example, a logic device or a combination of software and hardware. In other words, an entity executing the following processing procedure is not limited to the logic units, and may also be hardware or logic devices.

In the 1990s, improvements of a technology can be clearly distinguished between hardware improvements (for example, improvements to a circuit structure such as a diode, a transistor, or a switch) and software improvements (improvements to a method procedure). However, with the development of technology, improvements of many method procedures can be considered as direct improvements of hardware circuit structures. Designers almost all program an improved method procedure to a hardware circuit, to obtain a corresponding hardware circuit structure. Therefore, it does not mean that the improvement of a method procedure cannot be implemented by using a hardware entity module. For example, a programmable logic device (PLD) such as a field programmable gate array (FPGA) is a type of integrated circuit whose logic function is determined by a user by programming the device. The designers perform voluntary programming to "integrate" a digital system into a single PLD without requiring a chip manufacturer to design and prepare a dedicated integrated circuit chip. Moreover, nowadays, instead of manually making integrated circuit chips, this programming is mostly implemented by using "logic compiler" software, which is similar to the software compiler used in program development and writing. The original code is written in a specific programming language before compiling, and this language is referred to as a hardware description language (HDL). There are various kinds of HDLs, for example, advanced Boolean expression language (ABEL), altera hardware description language (AHDL), Confluence, Cornell university programming language (CUPL), HDCal, Java hardware description language (JHDL), Lava, Lola, MyHDL, PALASM, Ruby hardware description language (RHDL), and the like. Currently, the most commonly used HDLs are very-high-speed integrated circuit hardware description language (VHDL) and Verilog. A person skilled in the art should also understand that provided that a method procedure is logically programmed and then programmed to an integrated circuit by using the foregoing hardware description languages, a hardware circuit that implements the logical method procedure can be easily obtained.

The controller can be implemented in any suitable manner, for example, the controller can take the form of, for example, a microprocessor or processor and a computer-readable medium storing computer-readable program code (for example, software or firmware) executable by the processor, a logic gate, a switch, an application-specific integrated circuit (ASIC), a programmable logic controller and an embedded microcontroller. Examples of the controller include, but are not limited to, the following microcontrollers: ARC 625D, Atmel AT91SAM, Microchip PIC18F26K20, and Silicone Labs C8051F320. The memory controller can also be implemented as part of the memory control logic. A person skilled in the art will also appreciate that, in addition to implementing the controller in the form of pure computer-readable program code, it is also possible to implement, by logically programming the method steps, the controller in the form of a logic gate, switch, ASIC, programmable logic controller, and embedded microcontroller and other forms to achieve the same function. Such a controller can thus be considered as a hardware component and apparatuses included therein for implementing various functions can also be considered as structures inside the hardware component. Alternatively, apparatuses configured to implement various functions can be considered as both software modules implementing the method and structures inside the hardware component.

The system, the apparatus, the module or the unit described in the foregoing embodiments may be implemented by a computer chip or an entity specifically, or implemented by a product having a certain function. A typical implementation device is a computer. Specifically, the computer may be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, when the apparatus is described, the apparatus is divided into units according to functions, which are separately described. Certainly, during implementation of this disclosure, the functions of the units may be implemented in the same piece of or a plurality of pieces of software and/or hardware.

A person skilled in the art should understand that the embodiments of this disclosure may be provided as a method, a system, or a computer program product. Therefore, this disclosure may use a form of hardware only embodiments, software only embodiments, or embodiments with a combination of software and hardware. Moreover, this disclosure may use a form of a computer program product that is implemented on one or more computer-usable storage media (including but not limited to a disk memory, a CD-ROM, an optical memory, and the like) that include computer-usable program code.

This disclosure is described with reference to the flowcharts and/or block diagrams of the method, the device (system), and the computer program product according to the embodiments of this disclosure. It should be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the general-purpose computer or the processor of another programmable data processing device.

These computer program instructions may also be stored in a computer readable memory that can instruct a computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded into a computer or another programmable data processing device, so that a series of operation steps are performed on the computer or another programmable data processing device to generate processing implemented by a computer, and instructions executed on the computer or another programmable data processing device provide steps for implementing functions specified in one or more procedures in the flowcharts and/or one or more blocks in the block diagrams.

In a typical configuration, the computer device includes one or more processors (CPUs), an input/output interface, a network interface, and a memory.

The memory may include a form such as a volatile memory, a random-access memory (RAM) and/or a non-volatile memory such as a read-only memory (ROM) or a flash RAM in a computer-readable medium. The memory is an example of the computer-readable medium.

The computer-readable medium includes a non-volatile medium and a volatile medium, a removable medium and a non-removable medium, which may implement storage of information by using any method or technology. The information may be a computer-readable instruction, a data structure, a program module, or other data. Examples of computer storage media include but are not limited to a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or other magnetic storage device or any other non-transmission media that may be configured to store information that a computing device can access. Based on the definition in the present disclosure, the computer-readable medium does not include transitory computer readable media (transitory media), such as a modulated data signal and a carrier.

It should be further noted that the term "include," "comprise," or any other variants are intended to cover a non-exclusive inclusion, so that a process, a method, a commodity, or a device that includes a series of elements not only includes such elements, but also includes other elements not expressly listed, or further includes elements inherent to such a process, method, commodity, or device. Unless otherwise specified, an element limited by "include a/an . . . " does not exclude other same elements existing in the process, the method, the article, or the device that includes the element.

A person skilled in the art should understand that the embodiments of this disclosure may be provided as a method, a system, or a computer program product. Therefore, this disclosure may use a form of hardware only embodiments, software only embodiments, or embodiments with a combination of software and hardware. Moreover, this disclosure may use a form of a computer program product that is implemented on one or more computer-usable storage media (including but not limited to a disk memory, a CD-ROM, an optical memory, and the like) that include computer-usable program code.

This disclosure can be described in the general context of computer-executable instructions executed by a computer, for example, program modules. Generally, the program module includes a routine, a program, an object, a component, a data structure, and the like for executing a particular task or implementing a particular abstract data type. This disclosure may also be implemented in a distributed computing environment in which tasks are performed by remote processing devices connected by using a communication network. In a distributed computing environment, the program module may be located in both local and remote computer storage media including storage devices.

The embodiments of this disclosure are all described in a progressive manner, for same or similar parts in the embodiments, refer to these embodiments, and descriptions of each embodiment focus on a difference from other embodiments. Especially, a system embodiment is basically similar to a method embodiment, and therefore is described briefly; for related parts, reference may be made to partial descriptions in the method embodiment.

The descriptions are merely embodiments of this disclosure, and are not intended to limit this disclosure. For a person skilled in the art, various modifications and changes may be made to this disclosure. Any modification, equivalent replacement, and improvement made within the spirit and principle of this disclosure shall fall within the scope of the claims of this disclosure.

The invention claimed is:

1. A trajectory prediction method being implemented by an electronic processor, the method comprising:
obtaining trajectories of each obstacle within a predetermined range around a designated target and a historical trajectory of the designated target, the trajectories of each obstacle comprising a historical trajectory and a planned trajectory;
determining a historical interaction feature between each obstacle and the designated target according to the historical trajectory of each obstacle and the historical trajectory of the designated target;

predicting a motion trajectory of the designated target according to the historical interaction feature, to obtain an initial predicted trajectory;

determining a future interaction feature between each obstacle and the designated target according to the initial predicted trajectory and the planned trajectory of each obstacle; and adjusting the initial predicted trajectory according to the future interaction feature, to obtain a final predicted trajectory of the designated target; and, wherein determining the historical interaction feature between each obstacle and the designated target according to the historical trajectory of each obstacle and the historical trajectory of the designated target comprises:

inputting the historical trajectory of each obstacle and the historical trajectory of the designated target into a historical trajectory feature extraction submodel of a pre-trained prediction model, to obtain the historical interaction feature between each obstacle and the designated target outputted by the historical trajectory feature extraction submodel;

predicting the motion trajectory of the designated target according to the historical interaction feature, to obtain the initial predicted trajectory comprises:

inputting the historical interaction feature into an autoencoder in the prediction model, to obtain the initial predicted trajectory of the designated target outputted by the autoencoder;

determining the future interaction feature between each obstacle and the designated target according to the initial predicted trajectory and the planned trajectory of each obstacle comprises:

inputting the initial predicted trajectory and the planned trajectory of each obstacle into a planned trajectory feature extraction submodel of the prediction model, to obtain the future interaction feature between each obstacle and the designated target outputted by the planned trajectory feature extraction submodel; and adjusting the initial predicted trajectory according to the future interaction feature, to obtain the final predicted trajectory of the designated target comprises:

inputting the future interaction feature into a prediction submodel of the prediction model, to obtain the final predicted trajectory of the designated target outputted by the prediction submodel;

updating the initial predicted trajectory of an unmanned device using the final predicted trajectory and controlling the unmanned device based on the updated initial predicted trajectory.

2. The method according to claim 1, wherein the designated target is a dynamic non-unmanned device.

3. The method according to claim 2, wherein obtaining the trajectories of each obstacle within the predetermined range around the designated target comprises:

for each obstacle within the predetermined range around the designated target, obtaining, based on Internet of Vehicles, the planned trajectory planned by the obstacle in response to the obstacle is an unmanned device; and, wherein determining the future interaction feature between each obstacle and the designated target according to the initial predicted trajectory and the planned trajectory of each obstacle comprises:

using an initial predicted trajectory predicted for the obstacle as the planned trajectory of the obstacle in response to the obstacle is a dynamic non-unmanned device.

4. The method according to claim 1, wherein inputting the historical trajectory of each obstacle and the historical trajectory of the designated target into a historical trajectory feature extraction submodel of the pre-trained prediction model, to obtain the historical interaction feature between each obstacle and the designated target outputted by the historical trajectory feature extraction submodel comprises:

inputting the historical trajectory of the designated target into a first extraction model of the historical trajectory feature extraction submodel, and performing feature extraction on the historical trajectory of the designated target by the first extraction model, to obtain a first historical trajectory feature;

inputting the historical trajectory of each obstacle into a second extraction model of the historical trajectory feature extraction submodel, and performing feature extraction on the historical trajectory of each obstacle by the second extraction model, to obtain a second historical trajectory feature; and inputting the first historical trajectory feature and the second historical trajectory feature into a first feature processing model of the historical trajectory feature extraction submodel, and fusing the first historical trajectory feature and the second historical trajectory feature by the first feature processing model, to obtain the historical interaction feature between each obstacle and the designated target.

5. The method according to claim 4, wherein inputting the historical trajectory of the designated target into the first extraction model of the historical trajectory feature extraction submodel comprises:

inputting the historical trajectory of the designated target into an embedding layer in the first extraction model;

inputting an output of the embedding layer in the first extraction model into a long short-term memory network layer in the first extraction model; and inputting an output of the long short-term memory network layer in the first extraction model into a fully connected layer in the first extraction model; and inputting the historical trajectory of each obstacle into the second extraction model in the historical trajectory feature extraction submodel comprises:

inputting the historical trajectory of each obstacle into an embedding layer in the second extraction model; and inputting an output of the embedding layer in the second extraction model into a long short-term memory network layer in the second extraction model.

6. The method according to claim 1, wherein inputting the initial predicted trajectory and the planned trajectory of each obstacle into the planned trajectory feature extraction submodel of the prediction model, to obtain the future interaction feature between each obstacle and the designated target outputted by the planned trajectory feature extraction submodel comprises:

inputting the initial predicted trajectory into a third extraction model of the planned trajectory feature extraction submodel, and performing feature extraction on the initial predicted trajectory by using the third extraction model, to obtain an initial predicted trajectory feature;

inputting the planned trajectory of each obstacle into a fourth extraction model of the planned trajectory feature extraction submodel, and performing feature extraction on the planned trajectory of each obstacle by using the fourth extraction model, to obtain the planned trajectory feature; and inputting the initial predicted trajectory feature and the planned trajectory feature into a second feature processing model in the planned trajectory feature extraction submodel, and fusing the initial predicted trajectory feature and the planned trajectory feature by the second feature processing model, to obtain the future interaction feature between each obstacle and the designated target.

7. The method according to claim 6, wherein inputting the initial predicted trajectory into the third extraction model of the planned trajectory feature extraction submodel comprises:
inputting the initial predicted trajectory into an embedding layer in the third extraction model;
inputting an output of the embedding layer in the third extraction model into a long short-term memory network layer in the third extraction model; and
inputting an output of the long short-term memory network layer in the third extraction model into a fully connected layer in the third extraction model; and
the inputting the planned trajectory of each obstacle into a fourth extraction model in the planned trajectory feature extraction submodel comprises:
inputting the planned trajectory of each obstacle into an embedding layer in the fourth extraction model; and
inputting an output of the embedding layer in the fourth extraction model into a long short-term memory network layer in the fourth extraction model.

8. The method according to claim 1, wherein pre-training the prediction model comprises:
pre-obtaining trajectories of each sample obstacle within a predetermined range around a sample target and a historical trajectory of the sample target, the trajectories of each sample obstacle comprising a historical trajectory and a planned trajectory;
inputting the historical trajectory of the sample target and the historical trajectory of each sample obstacle into the historical trajectory feature extraction submodel, to obtain a to-be-optimized historical interaction feature outputted by the historical trajectory feature extraction submodel;
inputting the to-be-optimized historical interaction feature into the autoencoder in the prediction model, to obtain a to-be-optimized initial predicted trajectory of the sample target outputted by the autoencoder;
inputting the to-be-optimized initial predicted trajectory and the planned trajectory of each sample obstacle into the planned trajectory feature extraction submodel, to obtain a to-be-optimized future interaction feature outputted by the planned trajectory feature extraction submodel;
inputting the to-be-optimized future interaction feature into the prediction submodel, to obtain a to-be-optimized final predicted trajectory of the sample target; and
training the prediction model by using minimization of a difference between the to-be-optimized final predicted trajectory and a real motion trajectory of the sample target as a training objective.

9. A non-transitory computer-readable storage medium, storing a computer program, the computer program, when executed by a processor, causes the processor to perform:
obtaining trajectories of each obstacle within a predetermined range around a designated target and a historical trajectory of the designated target, the trajectories of each obstacle comprising a historical trajectory and a planned trajectory;
determining a historical interaction feature between each obstacle and the designated target according to the historical trajectory of each obstacle and the historical trajectory of the designated target;
predicting a motion trajectory of the designated target according to the historical interaction feature, to obtain an initial predicted trajectory;
determining a future interaction feature between each obstacle and the designated target according to the initial predicted trajectory and the planned trajectory of each obstacle; and
adjusting the initial predicted trajectory according to the future interaction feature, to obtain a final predicted trajectory of the designated target; and,
wherein determining the historical interaction feature between each obstacle and the designated target according to the historical trajectory of each obstacle and the historical trajectory of the designated target comprises:
inputting the historical trajectory of each obstacle and the historical trajectory of the designated target into a historical trajectory feature extraction submodel of a pre-trained prediction model, to obtain the historical interaction feature between each obstacle and the designated target outputted by the historical trajectory feature extraction submodel;
predicting the motion trajectory of the designated target according to the historical interaction feature, to obtain the initial predicted trajectory comprises:
inputting the historical interaction feature into an autoencoder in the prediction model, to obtain the initial predicted trajectory of the designated target outputted by the autoencoder;
determining the future interaction feature between each obstacle and the designated target according to the initial predicted trajectory and the planned trajectory of each obstacle comprises:
inputting the initial predicted trajectory and the planned trajectory of each obstacle into a planned trajectory feature extraction submodel of the prediction model, to obtain the future interaction feature between each obstacle and the designated target outputted by the planned trajectory feature extraction submodel; and
adjusting the initial predicted trajectory according to the future interaction feature, to obtain the final predicted trajectory of the designated target comprises:
inputting the future interaction feature into a prediction submodel of the prediction model, to obtain the final predicted trajectory of the designated target outputted by the prediction submodel;
updating the initial predicted trajectory of an unmanned device using the final predicted trajectory and controlling the unmanned device based on the updated initial predicted trajectory.

10. An electronic device, comprising a memory, a processor, and a computer program stored in the memory and executable on the processor such that when the processor executes the computer program, the processor is caused to perform:
obtaining trajectories of each obstacle within a predetermined range around a designated target and a historical trajectory of the designated target, the trajectories of each obstacle comprising a historical trajectory and a planned trajectory;
determining a historical interaction feature between each obstacle and the designated target according to the historical trajectory of each obstacle and the historical trajectory of the designated target;

predicting a motion trajectory of the designated target according to the historical interaction feature, to obtain an initial predicted trajectory;

determining a future interaction feature between each obstacle and the designated target according to the initial predicted trajectory and the planned trajectory of each obstacle; and adjusting the initial predicted trajectory according to the future interaction feature, to obtain a final predicted trajectory of the designated target; and wherein determining the historical interaction feature between each obstacle and the designated target according to the historical trajectory of each obstacle and the historical trajectory of the designated target comprises:

inputting the historical trajectory of each obstacle and the historical trajectory of the designated target into a historical trajectory feature extraction submodel of a pre-trained prediction model, to obtain the historical interaction feature between each obstacle and the designated target outputted by the historical trajectory feature extraction submodel;

predicting the motion trajectory of the designated target according to the historical interaction feature, to obtain the initial predicted trajectory comprises:

inputting the historical interaction feature into an autoencoder in the prediction model, to obtain the initial predicted trajectory of the designated target outputted by the autoencoder;

determining the future interaction feature between each obstacle and the designated target according to the initial predicted trajectory and the planned trajectory of each obstacle comprises:

inputting the initial predicted trajectory and the planned trajectory of each obstacle into a planned trajectory feature extraction submodel of the prediction model, to obtain the future interaction feature between each obstacle and the designated target outputted by the planned trajectory feature extraction submodel; and adjusting the initial predicted trajectory according to the future interaction feature, to obtain the final predicted trajectory of the designated target comprises:

inputting the future interaction feature into a prediction submodel of the prediction model, to obtain the final predicted trajectory of the designated target outputted by the prediction submodel;

updating the initial predicted trajectory of an unmanned device using the final predicted trajectory and controlling the unmanned device based on the updated initial predicted trajectory.

11. The device according to claim 10, wherein the designated target is a dynamic non-unmanned device.

12. The device according to claim 11, wherein obtaining the trajectories of each obstacle within the predetermined range around the designated target comprises:

for each obstacle within the predetermined range around the designated target, obtaining, based on Internet of Vehicles, the planned trajectory planned by the obstacle in response to the obstacle is an unmanned device; and determining the future interaction feature between each obstacle and the designated target according to the initial predicted trajectory and the planned trajectory of each obstacle comprises:

using an initial predicted trajectory predicted for the obstacle as the planned trajectory of the obstacle in response to the obstacle is a dynamic non-unmanned device.

13. The device according to claim 10, wherein inputting the historical trajectory of each obstacle and the historical trajectory of the designated target into a historical trajectory feature extraction submodel of the pre-trained prediction model, to obtain the historical interaction feature between each obstacle and the designated target outputted by the historical trajectory feature extraction submodel comprises:

inputting the historical trajectory of the designated target into a first extraction model of the historical trajectory feature extraction submodel, and performing feature extraction on the historical trajectory of the designated target by the first extraction model, to obtain a first historical trajectory feature;

inputting the historical trajectory of each obstacle into a second extraction model of the historical trajectory feature extraction submodel, and performing feature extraction on the historical trajectory of each obstacle by the second extraction model, to obtain a second historical trajectory feature; and inputting the first historical trajectory feature and the second historical trajectory feature into a first feature processing model of the historical trajectory feature extraction submodel, and fusing the first historical trajectory feature and the second historical trajectory feature by the first feature processing model, to obtain the historical interaction feature between each obstacle and the designated target.

14. The device according to claim 13, wherein inputting the historical trajectory of the designated target into the first extraction model of the historical trajectory feature extraction submodel comprises:

inputting the historical trajectory of the designated target into an embedding layer in the first extraction model;

inputting an output of the embedding layer in the first extraction model into a long short-term memory network layer in the first extraction model; and inputting an output of the long short-term memory network layer in the first extraction model into a fully connected layer in the first extraction model; and inputting the historical trajectory of each obstacle into the second extraction model in the historical trajectory feature extraction submodel comprises:

inputting the historical trajectory of each obstacle into an embedding layer in the second extraction model; and inputting an output of the embedding layer in the second extraction model into a long short-term memory network layer in the second extraction model.

15. The device according to claim 10, wherein inputting the initial predicted trajectory and the planned trajectory of each obstacle into the planned trajectory feature extraction submodel of the prediction model, to obtain the future interaction feature between each obstacle and the designated target outputted by the planned trajectory feature extraction submodel comprises:

inputting the initial predicted trajectory into a third extraction model of the planned trajectory feature extraction submodel, and performing feature extraction on the initial predicted trajectory by using the third extraction model, to obtain an initial predicted trajectory feature;

inputting the planned trajectory of each obstacle into a fourth extraction model of the planned trajectory feature extraction submodel, and performing feature extraction on the planned trajectory of each obstacle by using the fourth extraction model, to obtain the planned trajectory feature; and inputting the initial predicted trajectory feature and the planned trajectory feature into a second feature processing model in the planned trajectory feature extraction submodel, and fusing the initial predicted trajectory feature and the planned trajectory feature by the second feature processing model, to obtain the future interaction feature between each obstacle and the designated target.

16. The device according to claim 15, wherein the inputting the initial predicted trajectory into a third extraction model of the planned trajectory feature extraction submodel comprises:
  inputting the initial predicted trajectory into an embedding layer in the third extraction model;
  inputting an output of the embedding layer in the third extraction model into a long short-term memory network layer in the third extraction model; and
  inputting an output of the long short-term memory network layer in the third extraction model into a fully connected layer in the third extraction model; and
  the inputting the planned trajectory of each obstacle into a fourth extraction model in the planned trajectory feature extraction submodel comprises:
  inputting the planned trajectory of each obstacle into an embedding layer in the fourth extraction model; and
  inputting an output of the embedding layer in the fourth extraction model into a long short-term memory network layer in the fourth extraction model.

17. The device according to claim 10, wherein pre-training the prediction model comprises:
  pre-obtaining trajectories of each sample obstacle within a predetermined range around a sample target and a historical trajectory of the sample target, the trajectories of each sample obstacle comprising a historical trajectory and a planned trajectory;
  inputting the historical trajectory of the sample target and the historical trajectory of each sample obstacle into the historical trajectory feature extraction submodel, to obtain a to-be-optimized historical interaction feature outputted by the historical trajectory feature extraction submodel;
  inputting the to-be-optimized historical interaction feature into the autoencoder in the prediction model, to obtain a to-be-optimized initial predicted trajectory of the sample target outputted by the autoencoder;
  inputting the to-be-optimized initial predicted trajectory and the planned trajectory of each sample obstacle into the planned trajectory feature extraction submodel, to obtain a to-be-optimized future interaction feature outputted by the planned trajectory feature extraction submodel;
  inputting the to-be-optimized future interaction feature into the prediction submodel, to obtain a to-be-optimized final predicted trajectory of the sample target; and
  training the prediction model by using minimization of a difference between the to-be-optimized final predicted trajectory and a real motion trajectory of the sample target as a training objective.

* * * * *